US 6,200,211 B1

(12) United States Patent
Braeger et al.

(10) Patent No.: US 6,200,211 B1
(45) Date of Patent: Mar. 13, 2001

(54) PROCESS FOR FILETING FISH AND MACHINE FOR PERFORMING THIS PROCESS

(75) Inventors: Horst Braeger, Lubeck (DE); Richard Paul Scherch, Fort Myers, FL (US)

(73) Assignee: Baader North American Corp., Fort Myers, FL (US)

( * ) Notice: Subject to any disclaimer, the term of this patent is extended or adjusted under 35 U.S.C. 154(b) by 0 days.

(21) Appl. No.: 09/089,915

(22) Filed: Jun. 3, 1998

(30) Foreign Application Priority Data

Jun. 3, 1997 (DE) .............................. 197 23 179
Apr. 22, 1998 (DE) .............................. 198 17 840

(51) Int. Cl.⁷ .................................................. A22C 25/16
(52) U.S. Cl. ........................................... 452/162; 161/170
(58) Field of Search ................... 452/162, 161, 452/163, 170

(56) References Cited

U.S. PATENT DOCUMENTS

| | | | |
|---|---|---|---|
| 3,902,222 | * | 9/1975 | Hartmann .............................. 452/162 |
| 4,236,275 | * | 12/1980 | Westerdahl ........................... 452/162 |
| 4,748,723 | * | 6/1988 | Braeger et al. ....................... 452/162 |
| 5,106,335 | * | 4/1992 | Behnk et al. ......................... 452/162 |
| 5,871,395 | * | 2/1999 | Grabau et al. ........................ 452/162 |

FOREIGN PATENT DOCUMENTS

| | | | |
|---|---|---|---|
| 45 467 | * | 11/1966 | (DE) . |
| 1 454 089 | * | 6/1969 | (DE) . |
| 29 46 042 | * | 6/1981 | (DE) . |
| 36 32 561 | * | 5/1988 | (DE) . |
| 39 15 815 | * | 11/1990 | (DE) . |
| 466674 | * | 6/1937 | (GB) . |

OTHER PUBLICATIONS

Baader Food Processing Machinery, 184 Whitefish Filleting Machine, Brochure, Feb. 1994.*
Nordischer Maschinenbau Rud. Baader, 184 Whitefish Filleting Machine, Brochure.*
Baader Food Processing Machinery, The fastest way from whole Catfish . . . to h&g with BAADER 148 Heading and Cutting Machine, Brochure, Jul. 1996.*

* cited by examiner

Primary Examiner—Willis Little
(74) Attorney, Agent, or Firm—Knobbe, Martens, Olson & Bear, LLP

(57) ABSTRACT

In a fileting process for fish of the Siluridae species, for instance, catfish (*Ictalurus punctatus*), the bone plate present in the area of the dorsal fin of these species for supporting the dorsal spike is first undercut from the dorsal area without cutting through its connection to the bone structure, in order to obtain largely trim-free filets. This takes place by means of a cutting tool that makes incisions under the bone plate up to the ventral bones, so that, in the subsequent cutting free of the filet meat from the ventral bones, the outer parts of the bone plate accumulate separately from the filet meat.

15 Claims, 5 Drawing Sheets

PROCESS FOR FILETING FISH AND MACHINE FOR PERFORMING THIS PROCESS

FIELD OF THE INVENTION

The invention pertains to a process for decapitated fish of the Siluridae species, for instance, catfish (*Ictalurus punctatus*) as well as a machine for performing this process, comprising a device for transporting the fish in the direction of their longitudinal axis along a predetermined conveyance path, means arranged on either side for cutting the filet away from the bone structure and a measuring means for determining the size of the fish and controlling the processing tools as a function of the measurement result.

BACKGROUND OF THE INVENTION

When fileting fish, it is fundamentally important to maximize the yield of valuable filet meat and simultaneously to prevent undesired skeletal parts from remaining in the filet. If skeletal parts remain in the filet, expensive trimming work following the filet production is necessary to remove such parts from the filet meat. This trimming work is expensive particularly because only qualified personnel is eligible, which performs this processing manually.

A prerequisite for a filet production optimized in both senses is, among others, that the fish are aligned precisely in the position of their line of symmetry with respect to the fileting tools, so that cutting away the dorsal and ventral bones with narrowly spaced tools can take place without danger of skeletal parts being cut into.

In a known process, this problem is confronted in that the unpaired fins and fin-holders are first removed and then the fileting cuts for cutting away the dorsal and ventral bones are made. Such a process is known, for instance, from GB 466 674, in which, for fish conveyed in their longitudinal direction, incisions are made from both sides of the dorsal fins by cutters positioned at an angle, so that a strip of flesh comprising the fins and the fin-holder is cut out of the fish carcass.

For fish with an ordinary arrangement and formation of fins, this process leads to satisfactory fileting results, but cannot be applied to fish of the Siluridae species. The cause for this is the presence of a stable dorsal spike in front of the first dorsal fin and anchored by an internal column of bone to the front end of the spinal column and supported by a bone plate situated directly under the skin that holds the dorsal spike in place on the cranial roof.

In an ordinary back fileting cutting tool consisting of a pair of knives whose spacing is adapted to the width of the back ribs, the bone plate on either side of the dorsal spike is cut through, so that the outer parts of the bone plate remain in the filet meat and thus the aforementioned trimming work is necessary.

SUMMARY OF THE INVENTION

An aspect of the present invention is to specify a mechanical fileting method for fish of the Siluridae species by which filets can be obtained with a high yield of filet meat that make trimming work caused for the above reasons unnecessary.

The method involves that initially the bone plate (os exoccipitale) supporting the dorsal spike in the area of the first dorsal fin is first released from the filet meat by undercutting while leaving the connection to the bone structure intact, and then the filet meat is cut free from the bone structure. This method is preferably applied by a cutter tool processing the area of the dorsal spike. The cutter tool is arranged above the conveyance path and movable relative to the path of the fish and comprises two knives arranged symmetrical to the conveyance path and somewhat above. Each knife advantageously comprises a circular knife and is arranged with its cutting edge in a plane that is oriented essentially parallel to the conveyance path and, with the corresponding plane of the other knife, it encloses an obtuse angle opening away from the conveyance path.

Due to this method, the lateral parts of the bone plate are first released from the filet meat situated underneath and cut off by the following back fileting cut so that they fall off separately.

An additional optimization of effort and yield can be achieved in that the means for cutting the filet meat loose comprise a cutting tool for cutting away the dorsal bones with a pair of circular cutters that have a gap between them which can be controlled in width to pass through the dorsal bones. The gap between the circular cutters is established by means of an adjustment element that can be controlled by the measuring means. The gap is widened in the moment of arrival of the dorsal spike in the area of action of the circular cutters in order to avoid cutting into the bone column between the bone plate and the terminal area of the spinal column, as well as the edges of the dorsal spike.

The efficiency of the cutting tool processing the area of the dorsal spike can be limited in that the control of the cutting tool is accomplished by means of an adjustment element whose time of activation and actuation path are determined by the measuring means, the signal of which takes into account the size of the respective fish.

BRIEF DESCRIPTION OF THE DRAWINGS

The foregoing features and other features of the present invention will now be described with reference to the drawings of a preferred embodiment of an interface module. The illustrated embodiment is intended to illustrate, but not to limit the invention. The drawings include the following figures.

DETAILED DESCRIPTION OF THE PREFERRED EMBODIMENT

Figure 1:
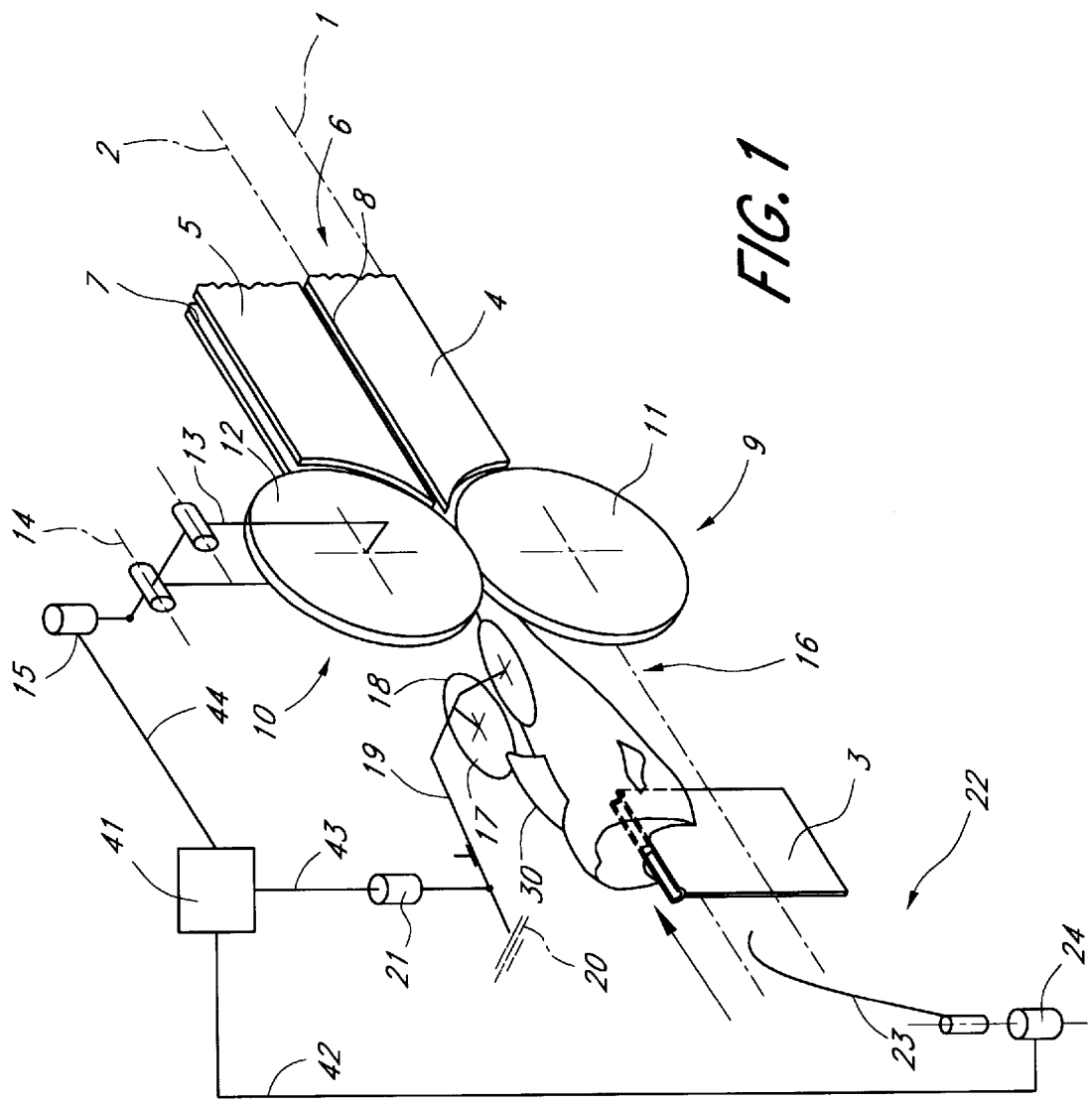
FIG. 1 shows a partial perspectival representation of a fileting machine for fish of the Siluridae species with a processing unit in the area of the dorsal spike.

FIG. 1 shows a partial perspectival representation of a fileting machine for fish of the Siluridae species with a processing unit in the area of the dorsal spike. In a frame, not shown, of the fileting machine for fish, a conveyance path 2 for the fish is formed. The conveyance path 2 is determined by the path of an endless chain conveyor 1, only suggested (in the drawing), which is equipped with push saddles 3 for holding the fish by their abdominal cavity and transporting the fish tail-first. Along the conveyance path 2, more specifically, above and below it, pairs of dorsal cut guides 4 and ventral cut guides 5 extend, leaving gaps 6 and 7, respectively, between one another and leaving a common lateral gap 8. Pairs of dorsal and ventral fileting knives 9 and 10, respectively, each consisting of a pair of axially opposing circular cutters 11 and 12, are located upstream of the guides 4 and 5 and essentially in their planes.

The dorsal fileting knives 10 are each seated on pivoting levers 13, which can be pivoted about axes 14 stationary with respect to the chassis and running parallel to the conveyance path 2 in the sense of modifying the spacing of the circular cutters 11. The pivot levers 13 are in synchronizing engagement with one another and an actuation element 15 acts on one of the pivoting levers 13.

Figure 2:
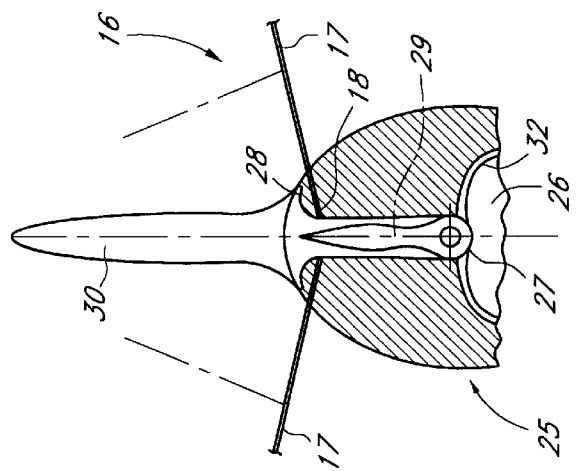
FIG. 2 shows a cross section through the fish in the area of the dorsal spike with the cutting tool for undercutting the bone plate in the operating position.

Upstream of the dorsal fileting knives 10 and above the path of the fish is located a cutting tool 16, consisting of a pair of driven circular cutters 17, as shown in FIGS. 1 and 2. The circular cutters 17 are arranged with their cutting edges 18 in planes essentially parallel to the conveyance path and enclose an obtuse angle opening upwards between them. The circular cutters 17 are seated on a crank 19 that is seated on a shaft 20 stationary with respect to the chassis and perpendicular to the conveyance path 2. An actuation element 21, which upon activation causes a shift in height of the circular cutters 17 with respect to the path of the fish, acts on the crank 19.

Upstream of the cutting tool 16 there is a measuring unit 22, illustrated in FIG. 1 for the sake of example and schematically as a sensing lever 23, which influences an angle encoder 24 such that, alternatively, a determination of the length or of the thickness of the fish is possible. Various alternative mechanical detecting systems could be used to indicate or measure the size of the fish in terms of its length, height or thickness as it is moved along the processing path by saddles 3 in order to provide information to position various cutters. The detection of the height of the fish is advantageous for positioning the cutters. Similarly, various optical systems could be used, such as an optical system reflecting radiation off the sides of the fish, or a photo-detector system sensing blockage or passage of light along axes corresponding to the width or height dimensions of the fish when its length is placed along the axis in which the fish moves for processing.

The functioning of the machine is as follows:

A decapitated fish 25 (see FIGS. 1 and 3), opened at its abdominal cavity 26 and gutted, is placed with its abdominal cavity on a push saddle 3 advanced by the endless chain conveyor 1 such that its tail points in the conveyance direction, the spinal column 27 rests on the saddle ridge and the end of the push saddle 3 pointing forward makes contact with the end of the abdominal cavity. The fish thus first moves into the area of the measuring unit 22, where it displaces the sensing lever 23. The maximal displacement travel of the sensing lever 23 is recorded by way of the angle encoder 24, as is the end of the fish in the form of the trailing head cut surface in relation to the position of the push saddle 3 in the machine and thus the position of the end of the fish's abdominal cavity. The measurement signal is processed in the ordinary manner, as explained further for FIGS. 6 and 7, in order to be provided as a control signal for the subsequent fileting processing of the fish. This begins by means of the cutting tool 16, which is initially held in such a position above the path of the fish that the circular cutters 17 pass over the fish without effect. The computer has determined from the measurement signal the position of the push saddle 3 at which the dorsal fin enters into the area of action of the cutting tool 16 and by what amount the latter is to be lowered in order to undercut said bone plate 28. At the moment of arrival of the dorsal fin in the area of the cutting tool 16, the latter is accordingly lowered by appropriate activation of the actuation element 21, so that the circular cutters 17 penetrate into the dorsal area of the fish and remain in this position until the head cut surface has passed through the area of the circular cutters 17. The incision is made up to the dorsal bones 29 without, however, cutting through the bone column 33 between the dorsal spike 30 and the bone structure.

Alternatively, the cutters 17 may be held at a stationary height relative to the fish and the saddle 3 raised so the cutters 17 engage the dorsal area of the fish at the desired location. In either embodiment, the cutting apparatus is always held in the same position relative to the dorsal surface regardless of the size of the fish.

Figure 3:
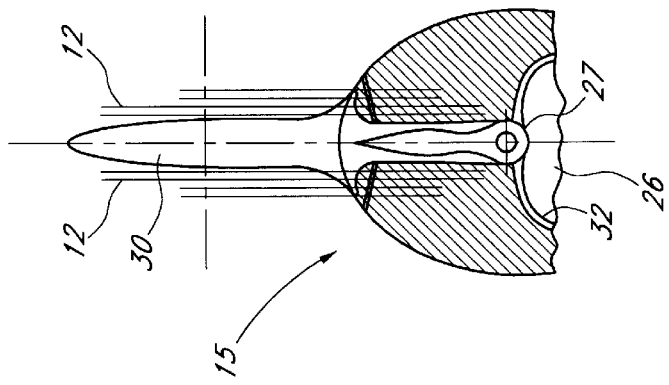
FIG. 3 shows a cross section through the fish in the area of the dorsal spike after performance of the back fileting cut.
Figure 4:
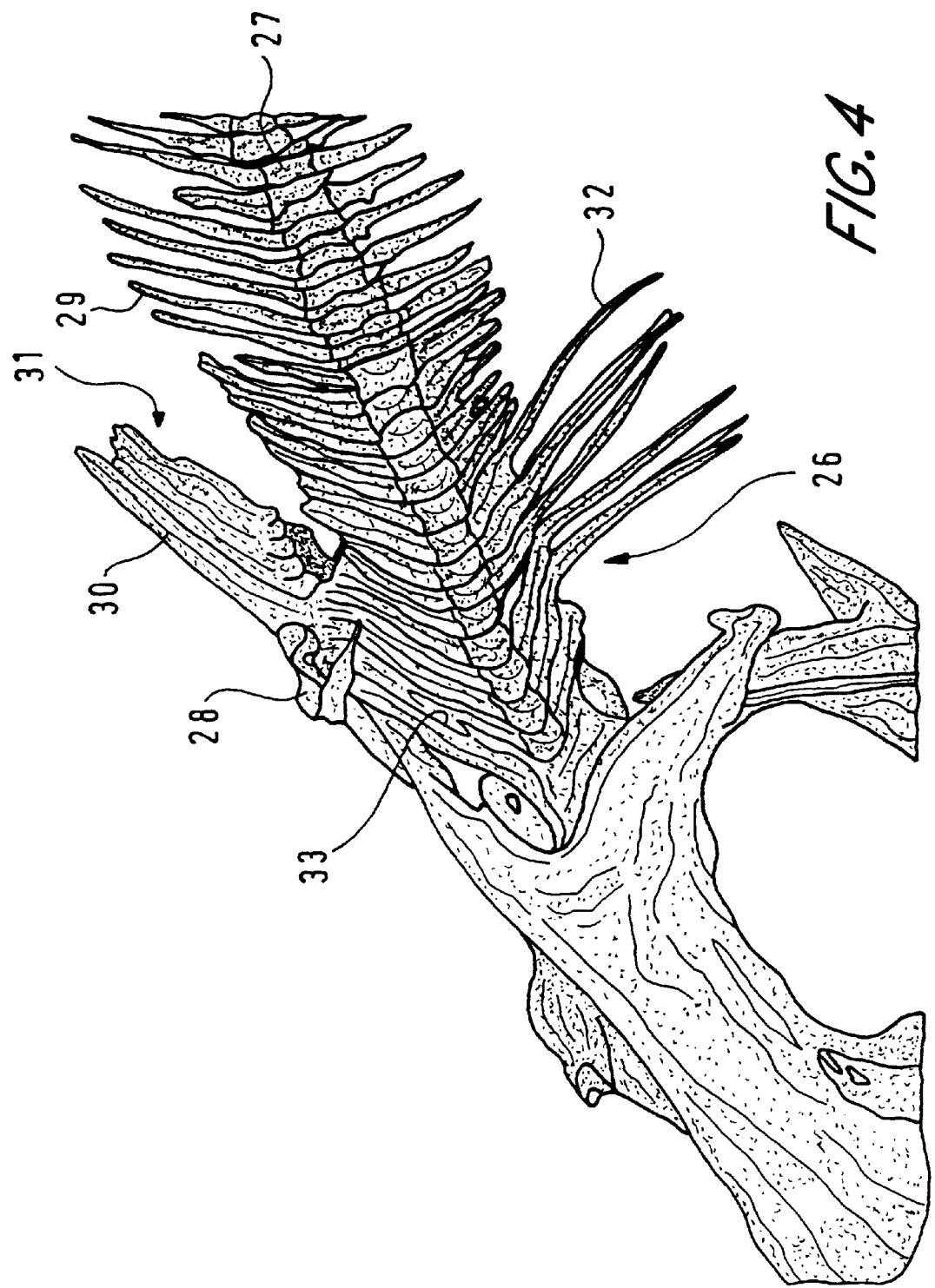
FIG. 4 shows a perspectival view of a catfish skeleton.

Subsequently the fish 25 moves into the area of action of the dorsal fileting knives 10, which cut into the fish on both sides of the dorsal bones 29, starting from the tail end. Upon entry of the dorsal fin 31 into the area of the circular cutters 12, the processed measurement signal brings about the activation of the actuation element 15, so that the circular cutters 12 are controlled to move apart, with the effect that the dorsal spike 30 can pass between the circular cutters 12 without being cut into. The spacing between the cutting edges of blades 12 is about 4 mm, increasing to about 6–8 mm to accommodate the dorsal bone and allow passage of the dorsal spike 30 between the cutters 12. The wider bone plate 28 is cut through on both sides of the dorsal spike 30 by this dorsal fileting cut, the cut planes of the circular cutters 12 intersecting those of the circular cutters 17 (see FIG. 3), so that the outer parts of the bone plate 28 fall off and thus accumulate separately from the filet meat. The ribs 32 are shown in FIGS. 3 and 4.

After this preparation the filet processing can take place in the usual manner, i.e., cutting the filet meat away from the belly, bones, ribs and the sides of the spinal column, as described, for instance, in DE 36 32 561, the disclosure and drawings of which are incorporated herein by reference.

Figure 6:
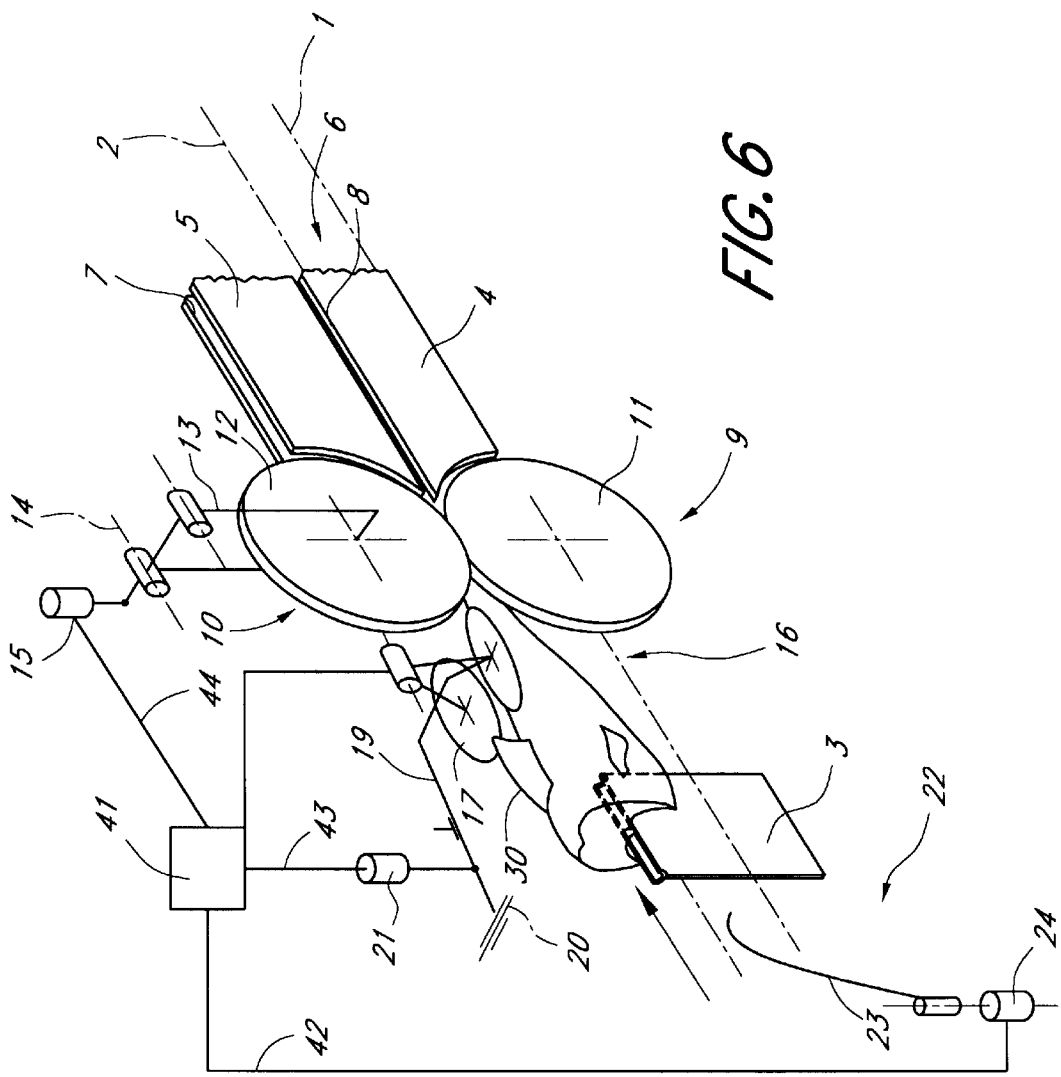
FIG. 6 shows a partial perspective view of a fileting machine for fish of the Siluridae species with a processing unit in the area of the dorsal spike, with a unit for pivoting and raising the height of the circular cutters.
Figure 7:
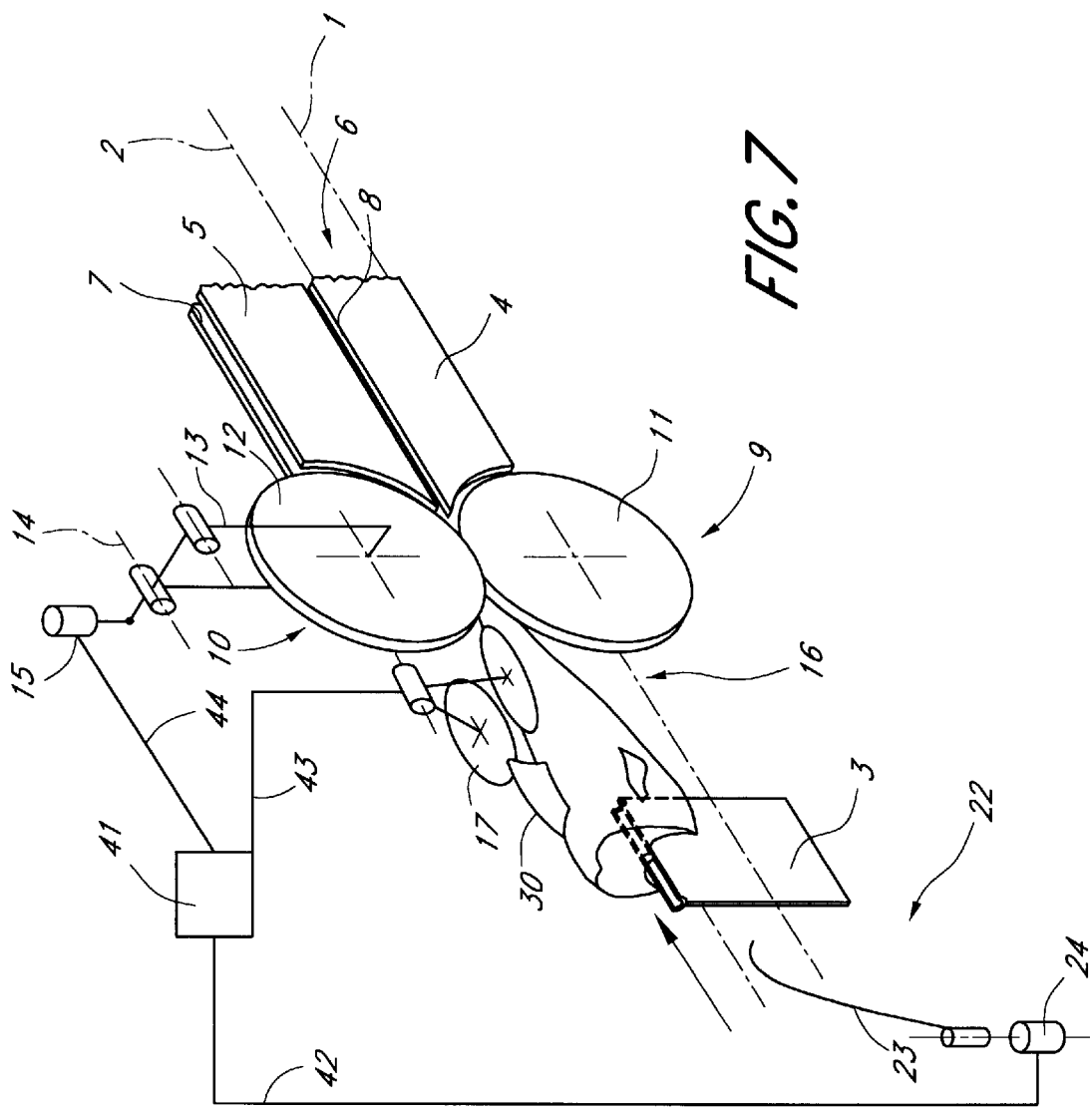
FIG. 7 shows a partial perspective view of a fileting machine for fish of the Siluridae species with a processing unit in the area of the dorsal spike, with circular cutters that can be pivoted with respect to their axis of rotation.

FIGS. 6 and 7 show the conveyance path 2 of a fileting machine for fish. The conveyance path 2 is determined by the path of a schematically illustrated endless chain conveyor 1, which is equipped with push saddles 3 for accommodating in their abdominal cavity and conveying the fish tail first. Along the conveyance path 2, above and below it, pairs of dorsal cut guides 4 and ventral cut guides 5 extend, leaving gaps 6 and 7, respectively, between one another and leaving a common lateral gap 8. Pairs of dorsal and ventral fileting knives 9 and 10, respectively, each consisting of a pair of axially opposing circular cutters 11 and 12, are located upstream of the guides 4 and 5 and essentially in their planes.

The dorsal fileting knives 10 are each seated on pivoting levers 13, which can be pivoted about axes 14 stationary with respect to the chassis and running parallel to the conveyance path 2 in the sense of modifying the spacing of the circular cutters 11 relative to each other. The cutting edges of the two cutters 11 are separated by about 4 mm, when the tail of the fish is first engaged for cutting. The spacing between the cutting edges of blades 11 increases to about 6–11 mm allow the saddles 3 to pass between the blades 11, although different designs could be used to accommodate relative movement of blades 11 and saddles 3. The pivot levers 13 are in synchronizing engagement with one another and an actuation element 15 acts on one of the pivoting levers 13 to allow movement of blades 11. The cutters 11 provide a counter pressure for cutter 12 as well as cutting the fish.

Upstream of the dorsal fileting knives 10 and above the path of the fish is located a cutting tool 16, consisting of a pair of driven circular cutters 17. The circular cutters 17 are arranged with their cutting edges 18 in planes essentially parallel to the conveyance path and enclose an obtuse angle opening upwards between them, the latter angle being variable in the embodiments of FIGS. 6 and 7. Whether the angle between the blades 17 is fixed as in the first embodiment, or variable as in the embodiment of FIGS. 6 and 7, the angle is advantageously about 150°–180°. According to the embodiment of FIG. 6, the circular cutters 17 are seated on a crank 19 that is seated on a shaft 20 stationary with respect to the chassis and perpendicular to the conveyance path 2. An actuation element 21, which upon activation causes a shift in height of the circular cutters 17 with respect to the path of the fish, acts on the crank 19.

Upstream of the cutting tool 16 there is a measuring unit 22, illustrated in FIGS. 6 and 7 for the sake of example and schematically as a sensing lever 23, which influences an angle encoder 24 such that, alternatively, a determination of the length or of the thickness of the fish is possible.

The functioning of the machine is as follows:

A decapitated fish 25, opened at its abdominal cavity 26 and gutted, is placed with its abdominal cavity on a push saddle 3 advanced by the endless chain conveyor 1 such that its tail points in the conveyance direction, the spinal column 27 rests on the saddle ridge and the end of the push saddle 3 pointing forward makes contact with the end of the abdominal cavity. The fish thus first moves into the area of the measuring unit 22, where it displaces the sensing lever 23. The maximal displacement travel of the sensing lever 23 is recorded by way of the angle encoder 24, as is the end of the fish in the form of the trailing head cut surface in relation to the position of the push saddle 3 in the machine and thus the position of the end of the fish's abdominal cavity. The measurement signal is fed via the measuring line 42 to a computer 41 and processed there in order to be supplied via control line 43 or 44 for the subsequent fileting processing of the fish. This begins by means of the cutting tool 16, which is initially held in such a position above the path of the fish that the circular cutters 17 pass over the fish without effect. The computer has determined from the measurement signal the position of the push saddle 3 at which the dorsal fin enters into the area of action of the cutting tool 16 and by what amount the latter is to be lowered, or by what angle relative to the rotating bearing 40 the circular cutters 17 are to be pivoted, in order to undercut said bone plate 28. At the moment of arrival of the dorsal fin in the area of the cutting tool 16, the latter is accordingly lowered by appropriate activation of the actuation element 21 and/or the rotating bearing is activated, so that the circular cutters 17 penetrate into the dorsal area of the fish and remain in this position until the head cut surface has passed through the area of the circular cutters 17. Advantageously, the incision is made up to the dorsal bones 29 without, however, cutting through the bone column 33 between the dorsal spike 30 and the bone structure. As needed, the cutters 17 can be configured to cut the dorsal bone 29, with or without cutting through the bone column 33.

In the alternative configuration according to FIG. 7, the height adjustment of the circular cutters 17 is omitted, since they need merely be pivoted about the rotating bearing 40, the signal for pivoting or for the angle at which to pivot reaching the computer 41 and, from there, the rotating bearing; this also applies to the seating of the circular cutters 17 illustrated in FIG. 6.

Figure 5:
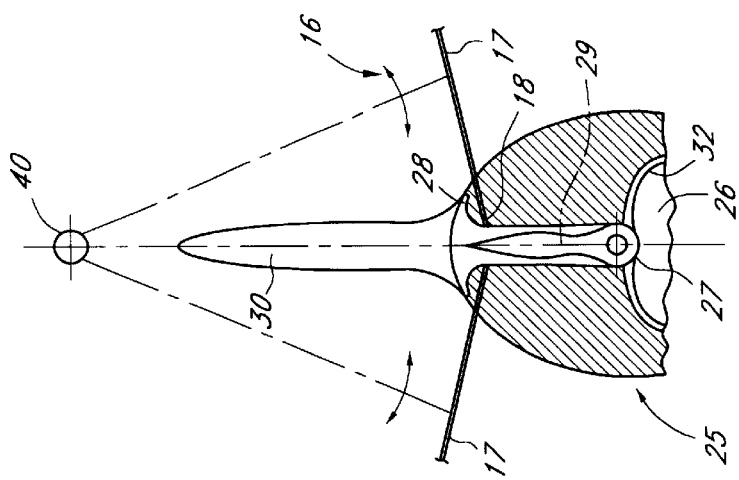
FIG. 5 shows a cross section through the fish in the area of the dorsal spike with the cutting tool for undercutting the bone plate in the operating position.

In another alternative configuration, the individually driven circular cutters 17, visible in FIG. 5, can be introduced into the area underneath the bone plate 28 individually suspended from, for instance, a guide essentially perpendicular to the long direction of the fish 25. So that they cut up to the dorsal bones 29 with their cutting edges 18 without cutting through them.

Subsequently the fish 25 moves, both in FIG. 6 and in FIG. 7, into the area of action of the dorsal fileting knives 10, which cut into the fish on both sides of the dorsal bones 29, starting from the tail end. Upon entry of the dorsal fin 31 into the area of the circular cutters 12, the processed measurement signal brings about the activation of the actuation element 15, so that the circular cutters 12 are controlled to move apart, with the effect that the dorsal spike 30 can pass between the circular cutters 12 without being cut into. The wider bone plate 28 is cut through on both sides of the dorsal spike 30 by this dorsal fileting cut, the cut planes of the circular cutters 12 intersecting those of the circular cutters 17, so that the outer parts of the bone plate 28 fall off and thus accumulate separately from the filet meal. After this preparation the filet processing can take place in the usual manner, as was discussed in the description of FIGS. 1–3.

In a further embodiment the dorsal spike is detected and used to start and position the cutters 17. As the fish moves on the saddle 3 the dorsal fin 31 passes between parallel guides spaced apart sufficiently to allow passage of the fin 31 between the guides. Erecting hubs protrude into the space separating the parallel guides to offer resistance to the flexible posterior dorsal fin as it passes through the guides. Positioned after the erecting hubs are a series of erecting fingers that ensure the fin stays erected through the fin guiding plates. Within the fin guiding plates is a capacitive sensor that senses the flexible extended rays of the dorsal fin 31. Output from the capacitive sensor is input to computer 41. The dorsal spike 30 is located at the end of the dorsal fin nearest the head. As the fish is moving tail first, the dorsal spike 30 is the last portion of the dorsal fin detected by the sensor. Thus, when the dorsal fin is no longer sensed the location of the dorsal spike 31 is known. Using the signal from the capacitive sensor, and based on the travel speed of the saddle 3 and fish, the location of the cutters 17 relative to the capacitive sensor, the computer 41 can determine when to start the cutters 17. Photo sensing or mechanical sensing of the dorsal fin can also be used in place of the capacitive sensor.

Referring to FIGS. 8 and 9, a further embodiment for rotating the cutters 17 is shown. Each of the cutters 17 is mounted to the end of a motor 100 which is in turn mounted to a bracket 104 that pivots about pivot 102a, 102b at one end to rotate about a point offset from the axis of rotation of cutters 17. The pivots 102a, 102b are on opposing sides of the conveyance path and on opposing sides of the dorsal fin of a fish passing between the cutters 17. Extendible pistons 106a, 106b have an extendible end 107a, 107b, rotatably connected to the bracket 104a, 104b, respectively. The pistons 106 may comprise solenoids, linear actuators, or other extensible members. An opposing end 109a, 109b of each piston 106a, 106b is rotatably mounted to a support 108, advantageously on the opposing side of the conveyance path as the bracket 104 to which the piston is connected. The opposing ends 109 of the pistons 106 may be adjustably positioned relative to the support 108 by sliding the ends 109 along slots 110, in order to adjust the location of the cutters 17. Once positioned the ends 109 are fastened so they only rotate but do not translate. The pistons 106, brackets 104 and support 108 provide a three-bar linkage that moves the cutters 17 into cutting position by extending one member of the three-bar linkage.

When the pistons 106 are extended as in FIG. 9, the brackets 104 pivot about pivot 102 to rotate the cutters 17 into a position to engage and cut the fish as it passes between the cutters. When the pistons 106 are retracted as in FIG. 8, the cutters do not engage the fish. Generally parallel channels 112 are shown between cutters 17, with the channels having openings to accommodate passage of the cutters 17, and to allow the dorsal fin of a fish to pass between the channels 112. There is thus provided a means for moving the cutters 17 into engagement with the dorsal fin area of a fish passing between the cutters.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. Method for mechanical fileting of decapitated fish having a dorsal spike and a bone plate supporting the dorsal spike in an area of a dorsal fin, comprising the steps of:
   undercutting the bone plate, said undercutting leaving a connection to a bone structure intact;
   releasing the bone plate from filet meat; and
   cutting the filet meat free from the bone structure.

2. The method of claim 1, further comprising the step of varying the distance between the bone plate and a cutting tool that performs the step of undercutting the bone plate.

3. The method of claim 1, wherein the step of undercutting the dorsal bone is performed by locating a cutting tool on each side of the bone plate to cut up to but not through a spine of the fish, and comprising the further step of increasing the distance between cutting edges of the cutting tools as the dorsal spike passes between the tools.

4. The method of claim 1, comprising the further step of cutting through the bone plate to intersect the cut made by the undercutting step and release a portion of the bone plate.

5. The method of claim 1, wherein the undercutting step further comprises the step of undercutting at an obtuse angle opening away from the conveyance path.

6. A machine for mechanical filleting decapitated fish having a dorsal spike and a bone plate supporting the dorsal spike in an area of a dorsal fin, comprising:
   a unit configured to convey the fish in the direction of a longitudinal axis of the fish along a predetermined conveyance path;
   at least two cutting knives arranged symmetrically to and on opposing sides of the conveyance path and above it, each knife having a cutting edge in the area of the dorsal spike and being movable relative to the conveyance path to engage the fish, each knife being arranged with its cutting edge in a plane that is oriented essentially parallel to the conveyance path and, together with the corresponding plane of the other knife, enclosing an obtuse angle opening away from the conveyance path, the knife cutters being located and configured to penetrate into the dorsal area of the fish immediately adjacent the dorsal bone so as to undercut the dorsal bone plate and remain until a head cut surface has passed through the area of action of the knife cutters during use of the cutters; and
   a measurement device detecting the size of the fish and providing a signal to a controller for use in controlling the movement of the cutters.

7. The machine according to claim 6, wherein the measurement device comprises means for determining the size of each fish and controlling the cutters as a function of the measurement result.

8. The machine according to claim 6, further comprising means for cutting the filet meat free from the bone structure.

9. The machine according to claim 6, wherein the knives are constructed as driven circular cutters.

10. The machine according to claim 8, wherein the means for cutting the filet meat free comprise a cutting tool for cutting away the dorsal bones with a pair of circular cutters, having between themselves a gap controllable with respect to width for passing the dorsal bones through.

11. The machine according to claim 10, wherein the gap between the circular cutters is controlled by an actuation element connected to the cutters that moves in response to a signal from the measurement device, the gap being enlarged in the moment of arrival of the dorsal spike in the area of action of the circular cutters.

12. The machine according to claim 6, wherein the control of the cutting tool takes place by means of an actuation element whose time of activation and actuation path are determined by the measuring device, whose signal takes into account the size measurement of the respective fish.

13. A machine for mechanical filleting decapitated fish having a dorsal spike and a bone plate supporting the dorsal spike in an area of a dorsal fin, comprising:
   a unit conveying the fish in the direction of a longitudinal axis of the fish along a predetermined conveyance path;
   means, including filleting knives, arranged on both sides of the conveyance path for cutting the filet meat free from a bone structure of the fish;
   measuring means for determining the size of each fish and controlling processing tools comprising the filleting knives and including cutting tools, as a function of the measurement result, wherein at least one cutting tool is provided that is arranged so as to be displaceable relative to the path of the fish and comprises two circular cutters arranged essentially symmetrical to the conveyance path, wherein each filleting knife is arranged with its cutting edge in a plane that is oriented essentially parallel to the conveyance path and wherein the circular cutters are configured and located such that their cutting edges can penetrate into the dorsal area of the fish essentially parallel relative to the long axis of the fish immediately adjacent the dorsal bone plate to undercut the dorsal bone plate.

14. The machine according to claim 13, wherein the cutting tool is adjustable in height.

15. The machine according to claim 13, wherein the circular cutter is arranged so as to be displaceable about a bearing.

* * * * *